United States Patent
Bagepalli et al.

(10) Patent No.: US 8,047,804 B2
(45) Date of Patent: Nov. 1, 2011

(54) WIND TOWER AND METHOD OF ASSEMBLING THE SAME

(75) Inventors: Bharat Sampathkumaran Bagepalli, Niskayuna, NY (US); Timothy Michael Grzybowski, Clifton Park, NY (US); Dustin Jon Wambeke, Greenville, SC (US); John P. Davis, Greer, SC (US)

(73) Assignee: General Electric Company, Schenectady, NY (US)

( * ) Notice: Subject to any disclaimer, the term of this patent is extended or adjusted under 35 U.S.C. 154(b) by 977 days.

(21) Appl. No.: 11/965,594

(22) Filed: Dec. 27, 2007

(65) Prior Publication Data

US 2009/0169393 A1    Jul. 2, 2009

(51) Int. Cl.
  *F03D 11/04* (2006.01)
(52) U.S. Cl. .................. 416/244 A; 416/244 R
(58) Field of Classification Search ............... 416/244 R, 416/244 A; 290/44, 45, 55
  See application file for complete search history.

(56) References Cited

U.S. PATENT DOCUMENTS

| | | | |
|---|---|---|---|
| 6,408,575 B1 | 6/2002 | Yoshida et al. | |
| 6,467,233 B1 | 10/2002 | Maliszewski et al. | |
| 6,470,645 B1 | 10/2002 | Maliszewski et al. | |
| 6,532,700 B1 | 3/2003 | Maliszewski et al. | |
| 6,590,300 B1 * | 7/2003 | Preito Santiago | 290/55 |
| 6,902,370 B2 | 6/2005 | Dawson et al. | |
| 7,160,085 B2 * | 1/2007 | de Roest | 416/244 R |

FOREIGN PATENT DOCUMENTS

WO   WO2007012200 A1 *   2/2007
WO   WO2007012201 A1 *   2/2007

OTHER PUBLICATIONS

3M VHB Tapes, Product Description, Nov. 2005.
3M VHB Tapes, Product Description, May 2007.
Durability Certification of Wind Turbines at GL-Wind, Industries overview, available at http://www.lmsintl.com/durability-wind-turbines-GL-wind (last viewed Aug. 19, 2007).

* cited by examiner

*Primary Examiner* — Igor Kershteyn
(74) *Attorney, Agent, or Firm* — James McGinnes, Esq.; Armstrong Teasdale LLP

(57) ABSTRACT

A method of assembling a tower for use with a wind turbine is provided. The method includes providing a plurality of tower segments. Each tower segment includes a first interface and a second interface. The method also includes bonding the first interface of a first tower segment to the second interface of a second tower segment using an adhesive composition.

20 Claims, 5 Drawing Sheets

WIND TOWER AND METHOD OF ASSEMBLING THE SAME

This application claims priority to U.S. application Ser. No. 11/870,949 entitled "Adhesive-Bonded Wind Tower" filed Oct. 11, 2007, which is hereby incorporated by reference in its entirety.

BACKGROUND OF THE DISCLOSURE

This application relates generally wind towers for use with a wind turbine, and more specifically, to wind towers that can be assembled using an adhesive composition to bond sections of the wind turbine tower together.

Wind turbines are increasingly used to generate electrical energy. At least some known wind turbines include a wind turbine tower, a nacelle located on the wind turbine tower and a rotor that is supported in the nacelle by means of a shaft. In at least some known wind turbines, the wind turbine tower includes three tower sections: a top section, a mid section, and a bottom section. Each tower section is fabricated from one to ten or more individual can segments that are typically welded together.

In known wind turbine towers, the top section is the section farthest from the ground and the bottom section contacts the ground. The mid tower section extends between the top and bottom sections. Each wind turbine tower section provides a portion of a robust structural load-path from the turbine to the ground. Moreover, the wind turbine tower sections also provide support to any mechanical and/or electrical internals that may be required by the system. Known wind turbine tower sections are connected together to form the wind turbine tower via welding, a bolted connection, and/or other known mechanical fastener assemblies. Specifically, the can segments of each wind turbine tower section are welded together to form each respective wind turbine tower section and adjacent tower sections are then coupled together to form the wind turbine tower.

With known wind turbines, the wind turbine tower is transported to the construction site using over-the-road trucks prior to being assembled. Aside from the insufficient maneuverability of a vehicle transporting a wind turbine tower section having a length of from about 60 feet to about 150 feet, road transportation of tower sections of 60 to 150 feet in length maybe costly. Furthermore, specific routes for transport have to be planned since narrow curves maybe difficult to navigate. Also, loading and unloading of long towers from the truck maybe difficult. As a result, sometimes tower sections must be transported by ship or helicopter, both of which may increase costs.

In view of the foregoing, it would be advantageous if the tower for the wind turbine could be easily assembled at the construction site. However, welding and other mechanical coupling methods that are typically used for producing a tower may not conveniently capable of being preformed at the construction site. As such, there is a need for an alternative means to connect wind turbine tower sections together to produce a wind turbine that can withstand the wind and temperature conditions to which wind turbines are typically subjected. Specifically, it would be advantageous to utilize an adhesive composition for bonding the tower sections together to create a wind turbine tower at the construction site. Additionally, it would be further advantageous to utilize the adhesive composition to bind can segments of the tower sections to create the tower sections themselves at the construction site.

BRIEF DESCRIPTION OF THE INVENTION

In one aspect, a method of assembling a tower for use with a wind turbine is provided. The method includes providing a plurality of tower segments. Each tower segment includes a first interface and a second interface. The method also includes bonding a first interface of a first tower segment to a second interface of a second tower segment using an adhesive composition.

In another aspect, a tower for use with a wind turbine is provided. The tower includes a plurality of tower segments. Each tower segment includes a first interface and a second interface. A first interface of a first tower segment is bonded to a second interface of a second tower segment by an adhesive composition.

In a further aspect, a wind turbine assembly is provided. The assembly includes a wind turbine and a tower. The wind turbine coupled to the tower. The tower includes a plurality of tower segments. Each tower segment includes a first interface and a second interface. A first interface of a first tower segment is bonded to a second interface of a second tower segment by an adhesive composition.

DETAILED DESCRIPTION OF THE INVENTION

Figure 1:
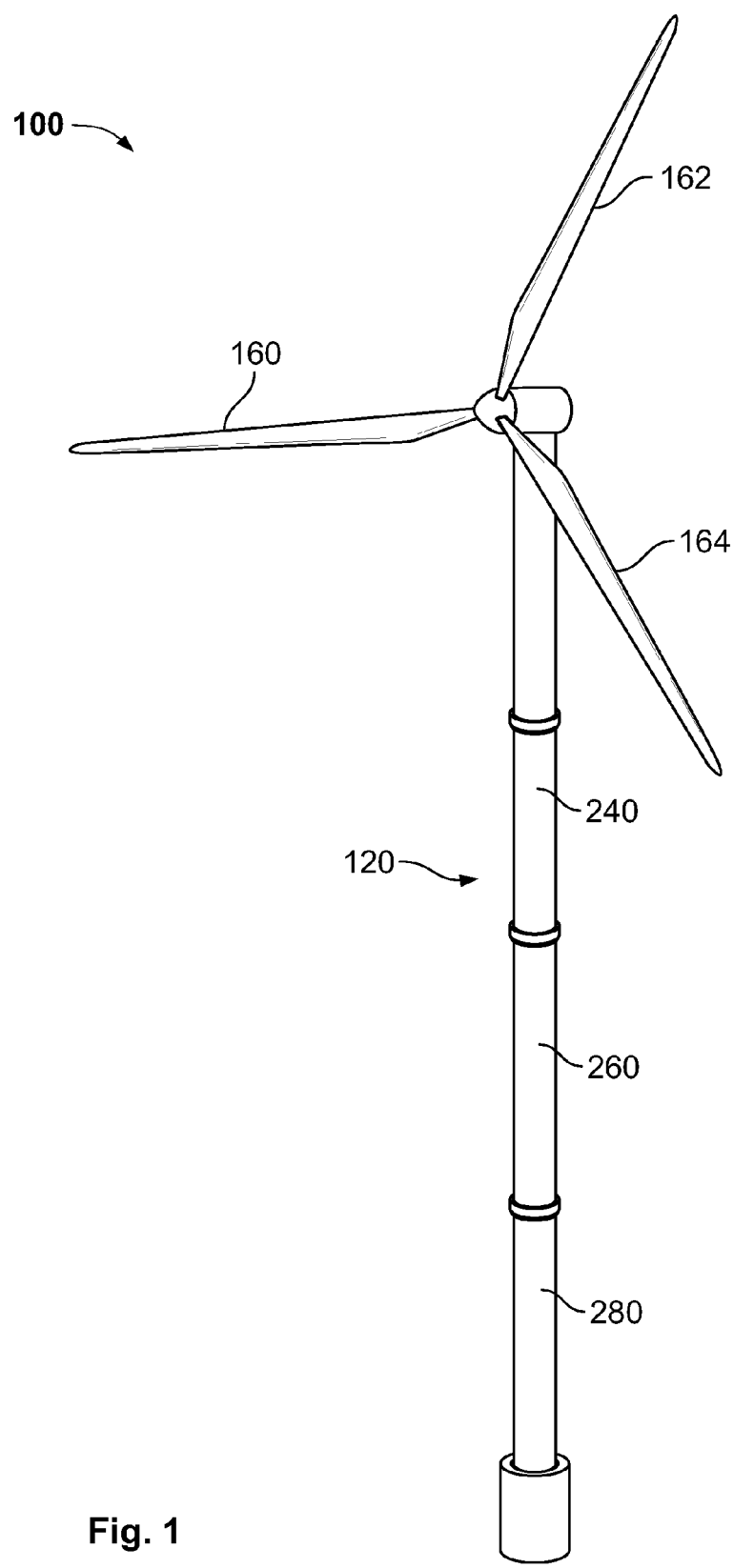
FIG. 1 is a perspective view of an exemplary wind turbine.
Figure 2:
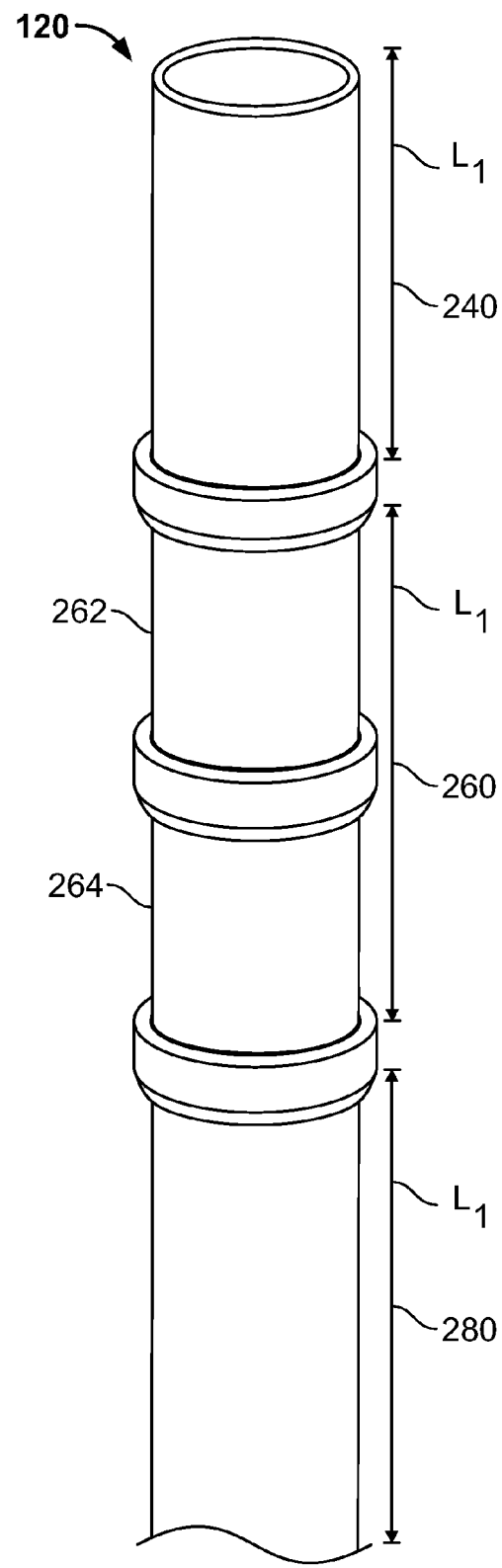
FIG. 2 is an enlarged perspective view of a portion of the wind turbine tower shown in FIG. 1.

FIG. 1 is a perspective view of an exemplary wind turbine 100 including a wind turbine tower 120 and three blades 160, 162, and 164. FIG. 2 is an enlarged perspective view of a portion of wind turbine tower 120. In the exemplary embodiment, wind turbine tower 120 is assembled from three sections: specifically, a top tower section 240, a mid tower section 260, and a base tower section 280. It should be understood by one skilled in the art that, while FIGS. 1 and 2 illustrate that wind turbine tower 120 includes only three tower sections 240, 260, and 280, a wind turbine tower may be assembled with more or less than three sections without departing from the scope of the present application. Further, in the exemplary embodiment a length $L_1$ of each tower section 240, 260, and 280 is between approximately twenty feet and approximately two hundred feet. Moreover, in the exemplary embodiment, a diameter $D_1$ of each tower section 240, 260, and 280 is approximately thirty feet.

Figure 3:
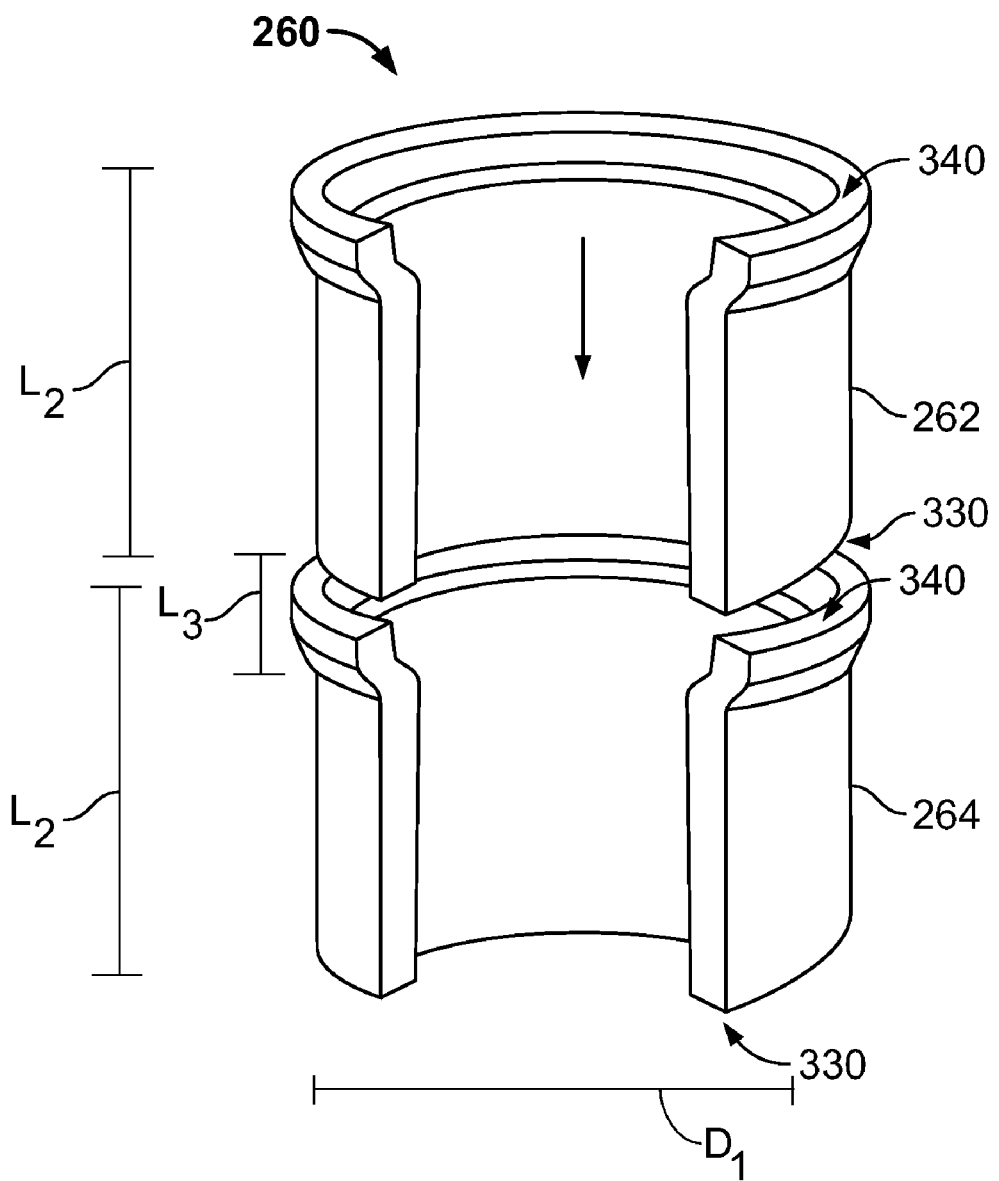
FIG. 3 is a partial cross-sectional view of can segments shown in FIG. 2.

In the exemplary embodiment, each wind turbine tower section 240, 260, and 280 is fabricated from one or more can segments 262 and 264, for example. FIG. 3 is a partial cross-sectional view of can segments 262 and 264 coupled together to form wind tower section 260. In the exemplary embodiment, wind turbine section 260 includes only two can segments 262 and 264 respectively. In an alternative embodiment, each tower section 240, 260, and 280 may include any suitable number of can segments. In the exemplary embodiment, each can segment 262 and 264 has a length $L_2$ that is between approximately ten and twenty feet, and a diameter $D_1$ of approximately thirty feet. Furthermore, in the exemplary embodiment, can segments 262 and 264 are each fabricated from the same steel material. Other non-metallic materials, such as, but not limited to, composite and/or concrete, may also be suitable for use in fabricating can segments 262 and 264.

In the exemplary embodiment, can segments 262 and 264 are each formed with a first interface 330 and a second interface 340. Each first interface 330 is coupled to a respective second interface 340 of can segment 264 via an adhesive composition (not shown) to form a tower section 260. In the exemplary embodiment, interfaces 330 and 340 overlap when can segments 262 is coupled to can segment 264. A length $L_3$ of the overlap depends on an amount of area needed to facilitate controlling shear and tensile stresses induced to the adhesive composition, and will typically range from approximately fifteen centimeters to approximately one hundred centimeters.

Figure 4:
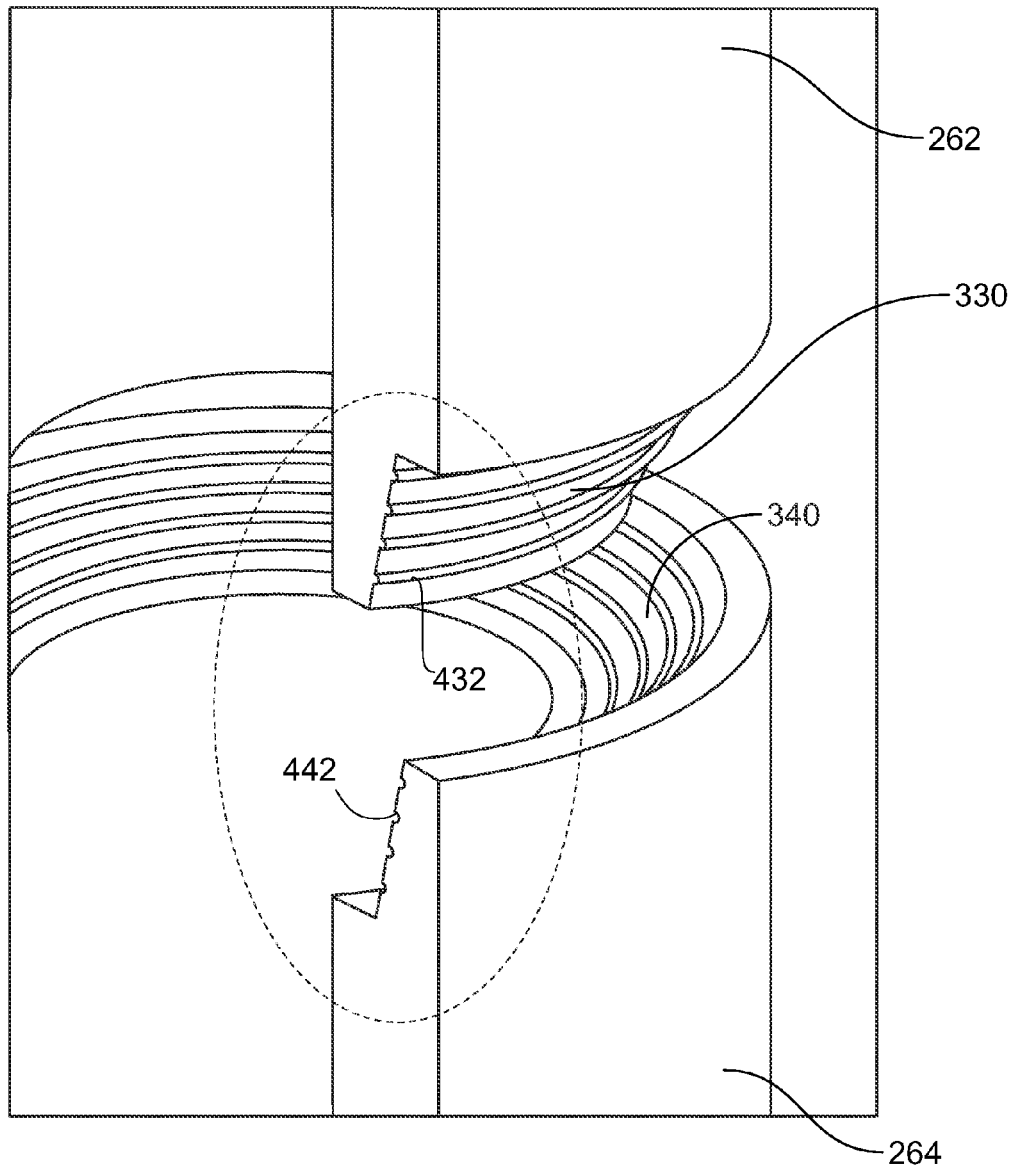
FIG. 4 is an enlarged view of the can segments shown in FIG. 3 being coupled together to a form the tower section shown in FIGS. 1 and 2.
Figure 5:
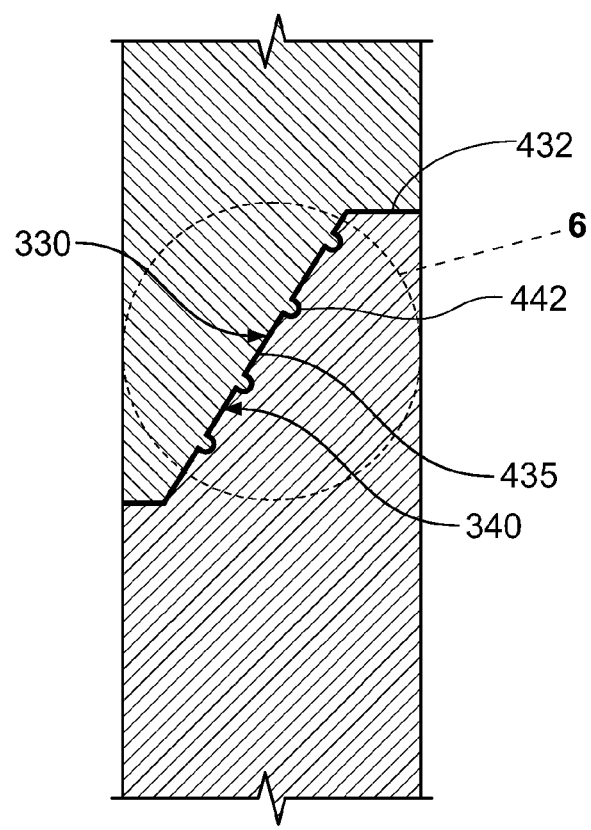
FIG. 5 is a cross-sectional view of a portion of the can segments shown in FIG. 4 and connected together.
Figure 6:
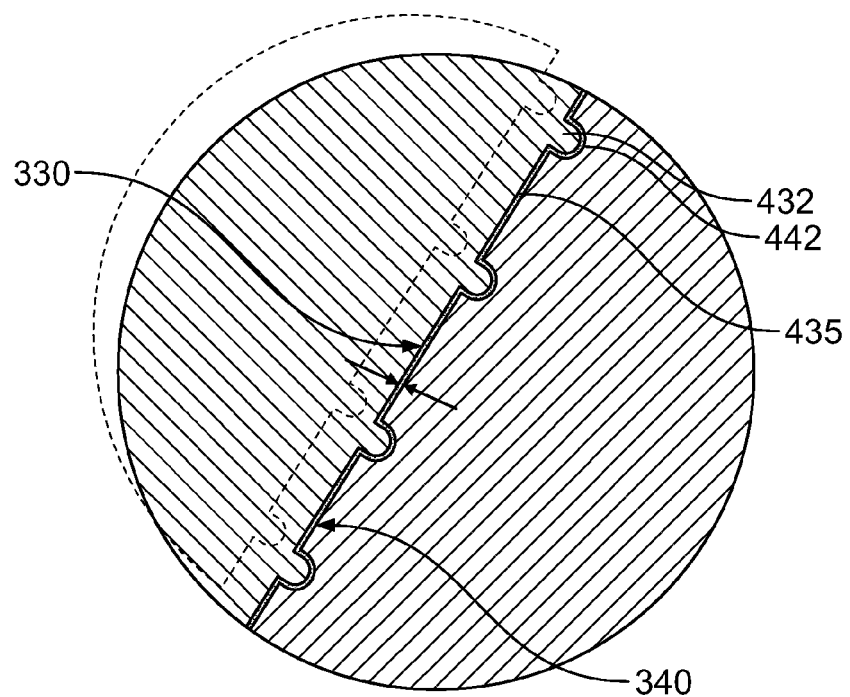
FIG. 6 is an enlarged view of a portion of the can segments shown in FIG. 5 and taken along area 6.

FIG. 4 is an enlarged view of can segments 262 and 264 being coupled together to form tower section 260. FIG. 5 is a cross-sectional view of a portion of can segments 262 and 264 coupled together. FIG. 6 is an enlarged view of a portion of can segments 262 and 264. Interfaces 330 and 340 can be any interface known to one skilled in the art of wind turbines. For example, in one embodiment, interfaces 330 and 340 are machined step interfaces. In another embodiment, interfaces 330 and 340 are pimple and groove interfaces configured to interlock together once connected. For example, FIGS. 4-6 illustrate first interface 330 of can segment 262 having a plurality of pimples 432 and second interface 340 of can segment 264 having a plurality of grooves 442.

In the exemplary embodiment, interfaces 330 and 340 are each formed with a tapered configuration. More specifically, in the exemplary embodiment, interfaces 330 and 340 are each tapered between approximately one degree and approximately five degrees. In another embodiment, and as would be appreciated by one skilled in the art, interfaces 330 and 340 may be tapered with any suitable degree that enables cans segments 262 and 264 to be coupled as described herein. Further, in the exemplary embodiment, an adhesive composition is applied to at least one of interfaces 330 and 340 using any suitable method, such as, but not limited to, a slot die method, a direct gravure method, an offset gravure with reverse roll transfer method, a curtain coating method, a slide (cascade) coating method, a forward and reverse roll coating method, an extrusion coating method, a rotary screen method, a spray nozzle application, a flexographic printing method, a brush application, and a pull and stick method.

In one embodiment, the adhesive composition is applied to first interface 330 of first can segment 262, and first can segment 262 is coupled to the second interface 340 of second can segment 264 to form wind turbine tower section 260. Typically, a layer of adhesive composition having a thickness of from approximately 0.5 millimeters (mm) to approximately 5 mm is applied to the first interface 330 of first can segment 262. In another embodiment, the adhesive composition is applied to second interface 340 of second can segment 264. In yet another embodiment, the adhesive composition is applied to both the first interface 330 of first can segment 262 and to the second interface 340 of second can segment 264.

Referring to FIGS. 4-6, in one embodiment, after adhesive composition 435 has been applied to can segments 262 and 264, segments 262 and 264 are forced together to form an interference fit. Specifically, as depicted in FIG. 6, the first interface 330 of first can segment 262 is coupled to the second interface 340 of second can segment 264 using an adhesive composition 435 and an interference fit. Typically, can segments 262 and 264 are held in position against each other using any suitable means, including, but not limited to, a clamp. The interference fit creates friction between the two interfaces 330 and 340 of can segments 262 and 264, thus facilitating a stronger bond. In some embodiments, the stronger bond created as a result of the interference friction enables a less strong adhesive composition to be used to create a wind turbine tower segment having the various functional properties as discussed below.

After the wind turbine tower sections 240, 260, and 280 are fabricated, they are bonded together at their respective interfaces 330 and 340 using the methods described herein. Specifically, as with can segments 262 and 264, adhesive composition 435 is applied to a first interface 330 of the first tower section 240 and then the first interface 330 of the first tower section 240 is contacted with a second interface 340 of the second tower section 260 to form tower 120.

It has been found that the can segments used for the wind turbine tower and the wind turbine tower sections of the wind turbine of the present disclosure can be suitably connected together using any adhesive composition having particular physical and functional properties to produce a wind turbine that meets Germanischer Lloyd (GL)-Wind Certification.

Specifically, in the exemplary embodiment, once assembled wind turbine 100 will have a total height of between approximately 160 feet to approximately 600 feet and have a diameter of between approximately 15 feet to approximately 45 feet. In order to be implemented for use as a wind turbine, wind turbine 100 must be GL-Wind certified. To be certified, manufacturers must design a wind turbine that will reliably produce low cost energy for 20 years while withstanding extreme wind and temperature conditions. Although the average load to which a wind turbine is subjected is minimal, random forces of extraordinary strength hit the structure at unpredictable intervals. As such, Germanischer Lloyd (GL) has found methods for accurately evaluating designs for fatigue-life under these conditions.

In one embodiment, wind turbine 100 is assembled using the adhesive-bonded can segments and tower sections, and is GL-wind certified. That is, wind turbine 100 has a 20-year wind fatigue life as required for GL-Wind certification under temperature conditions of from about −40° C. (−40° F.) to about 50° C. (122° F.). Furthermore, by using the adhesive composition, conventionally-used welding methods and materials or other mechanical connectors are no longer needed and, as such, can segments 262 and 264 and wind turbine tower sections 240, 260, and 280 can be coupled together at the construction site. Specifically, certain adhesive compositions have been found that are capable of providing suitable strength to the resulting wind turbine to replace rivets, spot welds, and other permanent mechanical fasteners.

In the exemplary embodiment, the adhesive compositions described herein have a tensile strength of at least about 500 kPa (72.5 lb/in$^2$). More suitably, in one embodiment, the adhesive composition has a tensile strength of at least about 600 kPa (87.0 lb/in$^2$); and even more suitably, of at least about 620 kPa (89.9 lb/in$^2$). In one embodiment, the adhesive compositions used herein suitably have a tensile strength of at least about 30 MPa (4350 lb/in$^2$).

Further, in the exemplary embodiment, the adhesive compositions used herein have a peel strength of at least about 210 N/mm. More suitably, in one embodiment, the adhesive compositions have a peel strength of at least about 300 N/mm; and even more preferably, of at least about 350 N/mm.

Moreover, in the exemplary embodiment, the adhesive compositions used herein suitably have a dynamic shear strength of at least about 450 kPa (62.3 lb/in$^2$). More suitably, in one embodiment, the adhesive compositions have a dynamic shear strength of at least about 480 kPa (69.6 lb/in$^2$); more preferably, of at least about 500 kPa (72.5 lb/in$^2$); and even more suitably at least about 550 kPa (79.8 lb/in$^2$).

In addition, in the exemplary embodiment, the adhesive compositions used herein suitably have a static shear strength, at a temperature of approximately 72° F. (22° C.), of at least about 1000 grams. More suitably, the adhesive compositions have a static shear strength at a temperature of approximately 72° F. (22° C.) of at least about 1250 grams; and even more suitably at a temperature of approximately 72° F. (22° C.) of at least about 1500 grams. Additionally, the adhesive compositions used herein suitably have a static shear strength at a temperature of approximately 150° F. (66° C.) of at least about 500 grams. More suitably, the adhesive compositions have a static shear strength at a temperature of approximately 150° F. (66° C.) of at least about 750 grams; and even more suitably at a temperature of approximately 150° F. (66° C.) of at least about 1000 grams.

Particularly preferred adhesive compositions for use in the present disclosure are VHB™ (Very High Bond) adhesives, commercially available, for example, from 3M Worldwide (St. Paul, Minn.). Specifically, VHB™ adhesives are typically acrylic foam adhesives showing viscoelastic properties. The foam adhesive composition absorbs energy to provide a high level of strength, as well as excellent fatigue resistance and sound and vibration damping properties. Various VHB™ adhesives can be used in the present disclosure. Examples of VHB™ adhesives include multi-purpose acrylic VHB™ adhesive (e.g., VHB™ adhesive Nos. 4941 and 4945); general purpose acrylic VHB™ adhesive (e.g., VHB™ adhesive Nos. 4950; 4611; and 4622); and low temperature appliable acrylic VHB™ adhesives (e.g., VHB™ adhesive No. 4951).

In one particularly preferred embodiment, the adhesive composition also includes a damping material that can attenuate dynamic vibratory loads, and can also serve to reduce noise transmission.

When introducing elements of the present disclosure or preferred embodiments thereof, the articles "a", "an", "the", and "said" are intended to mean that there are one or more of the elements. The terms "comprising", "including", and "having" are intended to be inclusive and mean that there may be additional elements other than the listed elements.

The above-described system and methods facilitate providing a wind turbine tower that can be assembled at a construction site. Accordingly, the wind turbine tower sections can be shipped in smaller sections than known wind turbine tower sections. As such, the above-described system and methods facilitate reducing costs associated with transporting and assembling wind turbine towers.

As various changes could be made in the above constructions and methods without departing from the scope of the disclosure, it is intended that all matter contained in the above description and shown in the accompanying drawings shall be interpreted as illustrative and not in a limiting sense.

What is claimed is:

1. A method of assembling wind turbine tower, said method comprising:
   providing a first tower segment having a first interface, wherein the first interface includes a pimple;
   providing a second tower segment having a second interface, wherein the second interface includes a dimple; and
   bonding the first interface of the first tower segment to the second interface of the second tower segment using an adhesive composition such that the pimple is inserted into the dimple.

2. The method according to claim 1 wherein said providing a first tower segment having a first interface comprises providing the first interface with a plurality of the pimples, and wherein said providing a second tower segment having a second interface comprises providing the second interface with a plurality of the dimples, said bonding the first interface of the first tower segment to the second interface of the second tower segment comprising bonding the first interface to the second interface such that each of the pimples is inserted into a corresponding one of the dimples.

3. The method according to claim 1
   wherein the first tower segment and the second tower segment are bonded together to form a tower section, said method further comprising:
   bonding at least two of the tower sections together to form the tower.

4. The method according to claim 1 wherein said bonding the first interface of the first tower segment to the second interface of the second tower segment using an adhesive composition further comprises bonding the first interface of the first tower segment to the second interface of the second tower segment using an adhesive composition that has a peel strength of at least 210 N/mm.

5. The method according to claim 1 wherein said bonding the first interface of the first tower segment to the second interface of the second tower segment using an adhesive composition further comprises bonding the first interface of the first tower segment to the second interface of the second tower segment using an adhesive composition that has a tensile strength of at least 500 kPa.

6. The method according to claim 1 wherein said bonding the first interface of the first tower segment to the second interface of the second tower segment using an adhesive composition further comprises bonding the first interface of the first tower segment to the second interface of the second tower segment using an adhesive composition that has a dynamic shear strength of at least 450 kPa.

7. The method according to claim 1 wherein said bonding the first interface of the first tower segment to the second interface of the second tower segment using an adhesive composition further comprises bonding the first interface of the first tower segment to the second interface of the second tower segment using an adhesive composition that has a static shear strength at a temperature of approximately 22° C. of at least 1000 grams and a static shear strength at a temperature of approximately 66° C. of at least 500 grams.

8. A wind turbine tower assembly comprising:
   a first tower segment comprising a first interface, wherein said first interface comprises a pimple; and
   a second tower segment comprising a second interface, wherein said second interface comprises a dimple, said first interface of said first tower segment configured to be bonded to said second interface of said second tower segment by an adhesive composition such that said pimple is inserted into said dimple.

9. The wind turbine tower assembly according to claim 8 wherein:
   said first interface comprises a plurality of said pimples; and
   said second interface comprises a plurality of said dimples, wherein each of said pimples is configured for insertion into a corresponding one of said dimples.

10. The wind turbine tower assembly according to claim 8 wherein:
said first tower segment and said second tower segment are bonded together to form a tower section; and
at least two of said tower sections are bonded together to form said tower.

11. The wind turbine tower assembly according to claim 8 wherein said first interface is tapered.

12. The wind turbine tower assembly according to claim 8 wherein said second interface is tapered.

13. The wind turbine tower assembly according to claim 8 wherein said first interface and said second interface are tapered such that said first tower segment and said second tower segment are configured to be telescopically coupled together.

14. The wind turbine tower assembly according to claim 8 wherein said dimple is a circumferentially oriented groove.

15. A wind turbine tower assembly comprising:
an adhesive composition;
a first tower segment comprising a first interface, wherein said first interface comprises a pimple; and
a second tower segment comprising a second interface, wherein said second interface comprises a dimple, said first interface of said first tower segment configured to be bonded to said second interface of said second tower segment by said adhesive composition such that said pimple is inserted into said dimple.

16. The wind turbine tower assembly according to claim 15 wherein:
said first interface comprises a plurality of said pimples; and
said second interface comprises a plurality of said dimples, wherein each of said pimples is configured for insertion into a corresponding one of said dimples.

17. The wind turbine tower assembly according to claim 15 wherein said adhesive composition has a peel strength of at least 210 N/mm.

18. The wind turbine tower assembly according to claim 15 wherein said adhesive composition has a tensile strength of at least 500 kPa.

19. The wind turbine tower assembly according to claim 15 wherein said adhesive composition has a dynamic shear strength of at least 450 kPa.

20. The wind turbine tower assembly according to claim 15 wherein said adhesive composition has a static shear strength at a temperature of approximately 22° C. of at least 1000 grams and a static shear strength at a temperature of approximately 66° C. of at least 500 grams.

\* \* \* \* \*

UNITED STATES PATENT AND TRADEMARK OFFICE
CERTIFICATE OF CORRECTION

PATENT NO. : 8,047,804 B2  
APPLICATION NO. : 11/965594  
DATED : November 1, 2011  
INVENTOR(S) : Bagepalli et al.

Page 1 of 1

It is certified that error appears in the above-identified patent and that said Letters Patent is hereby corrected as shown below:

Col. 5, line 61, in Claim 1, delete "of assembling wind turbine" and insert therefor -- of assembling a wind turbine --.

Signed and Sealed this
Fourteenth Day of February, 2012

David J. Kappos
*Director of the United States Patent and Trademark Office*